US 7,693,266 B1

(12) United States Patent
Ray

(10) Patent No.: US 7,693,266 B1
(45) Date of Patent: Apr. 6, 2010

(54) METHOD AND SYSTEM FOR MEASURING ACOUSTIC QUALITY OF WIRELESS CUSTOMER PREMISES EQUIPMENT

(75) Inventor: Amar Nath Ray, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 914 days.

(21) Appl. No.: 11/022,541

(22) Filed: Dec. 22, 2004

(51) Int. Cl.
*H04M 1/24* (2006.01)
*H04M 3/08* (2006.01)
*H04M 3/22* (2006.01)
*H04W 24/00* (2009.01)
*H04B 17/00* (2006.01)

(52) U.S. Cl. ............... 379/27.03; 379/15.01; 379/22.02; 379/24; 379/29.01; 455/423; 455/67.11

(58) Field of Classification Search ............. 379/15.01, 379/22.02, 22.08, 24, 27.03, 29.01, 1.02; 455/423, 67.11
See application file for complete search history.

(56) References Cited

U.S. PATENT DOCUMENTS

| 6,282,265 | B1* | 8/2001 | Lowell et al. ................. 379/25 |
| 6,453,153 | B1* | 9/2002 | Bowker et al. ........... 455/67.14 |
| 6,477,492 | B1* | 11/2002 | Connor ....................... 704/236 |
| 6,819,924 | B1* | 11/2004 | Ma et al. ..................... 455/425 |
| 6,912,269 | B2* | 6/2005 | Hardy et al. .............. 379/29.01 |
| 2005/0124296 | A1* | 6/2005 | Hayashi ................... 455/67.11 |
| 2006/0034300 | A1* | 2/2006 | Barzegar et al. ........... 370/401 |
| 2006/0093094 | A1* | 5/2006 | Xing et al. ................ 379/1.02 |

* cited by examiner

*Primary Examiner*—Nick Corsaro
*Assistant Examiner*—Un C Cho

(57) ABSTRACT

A method, system, and medium are provided for testing a network communications component. A model of a substantially ideal communications network is provided and a test signal is generated at an input of the network model. An output signal from the model is transmitted to the network component. The signal is suitable for analyzing acoustic parameters of the network component. The acoustic parameters are analyzed based upon a response of the network component to the output signal.

22 Claims, 10 Drawing Sheets

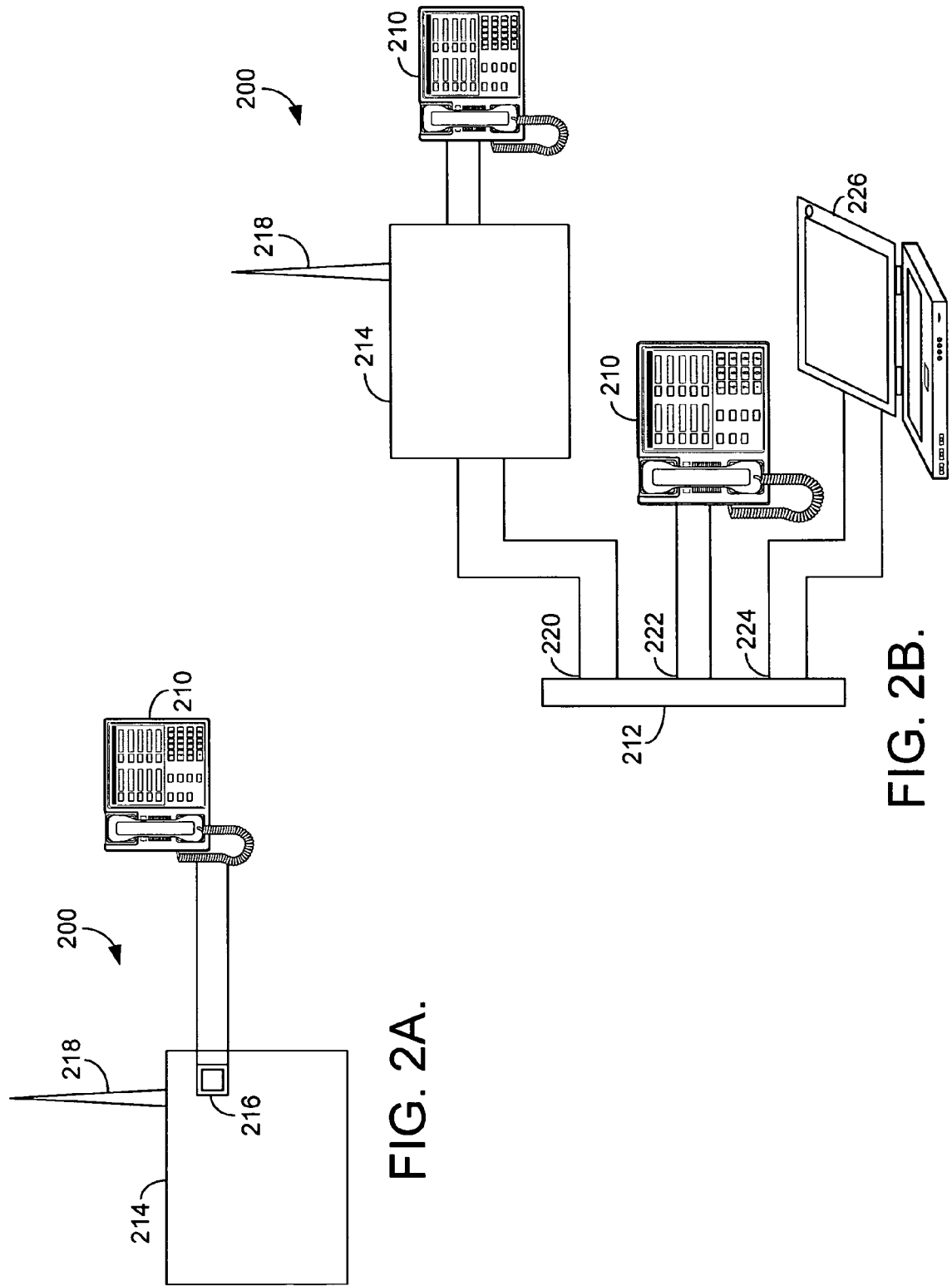

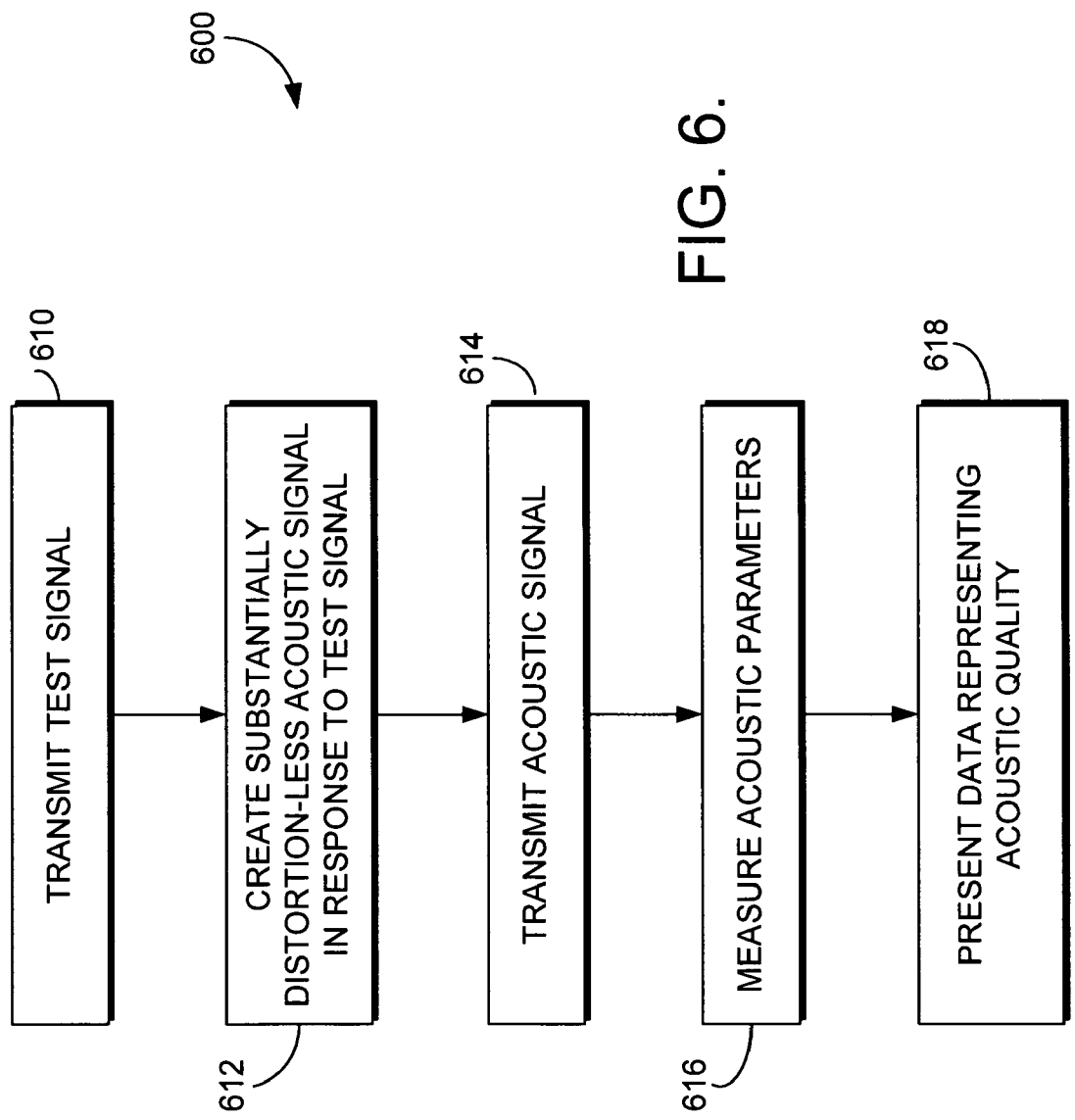

METHOD AND SYSTEM FOR MEASURING ACOUSTIC QUALITY OF WIRELESS CUSTOMER PREMISES EQUIPMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

With the advancement of wireless technology, customer expectations of voice quality are increasing. Several types of fixed wireless or mobile wireless handset units are available in today's market. Moreover, various wireless carriers provide levels of voice quality that vary from carrier to carrier.

Research in the consumer and domestic markets suggests that the voice quality provided by, for example, U.S. wireless carriers, vary significantly from end-point customer premises equipment (CPE) unit to unit and also from brand to brand. The voice quality of wireless carriers have yet to reach the average voice quality of traditional fixed-line telephone networks. Furthermore, the increasing uses of wireless HUBs eliminate the need for a customer to have both a wireless account and a traditional land-line account. Wireless HUBs allow the customer to access a wireless network using, for example, a personal computer or traditional land-line phone. By measuring, fixing, and controlling the quality of the end-point wireless CPE (e.g., wireless HUB or wireless handset), it is possible to approach the voice quality of traditional fixed-line networks.

Referring to FIG. 3A, there is illustrated block diagram of a system 300A that illustrates a historical shortcoming associated with attempting to measure the acoustic quality of an endpoint: that the acoustic quality of the entire wireless network, including the end-point CPE, would be measured In system 300A, a test signal is transmitted from an output 312A of a digital speech language analyzer (DLSA) 302A. The test signal propagates through a wall jack 316A to a communications network. The network comprises a central office (CO) 318A, and a cellular base station and antenna 320A. The test signal is transmitted from antenna 320A to a HUB 322A. An input 314A of DSLA 302A receives the test signal. The test signal is then analyzed to determine voice quality. However, the overall voice quality includes distortion from network elements 318A, 320A, and HUB 322A.

SUMMARY

Embodiments of the present invention provide a system and method for determining the acoustic quality of the wireless CPE by measuring the acoustic frequency responses. Further, embodiments of the present invention have several practical applications in the technical arts including the identification and evaluation of problems responsible for degrading voice quality in networks by the CPE coupled at end-points of the network.

In one embodiment, a method is provided for testing a network communications component. The method comprises of providing a model of a substantially ideal communications network, generating a test signal at an input of the network model, and providing an output signal from the model to the network component suitable for analyzing acoustic parameters of the network component. Finally, analyzing the acoustic parameters based upon a response of the network component to the output signal.

In another embodiment, a method is provided for evaluating acoustic qualities of a component in a network. The method comprises providing a network device that represents a substantially distortionless communications network, coupling the network device to the component, and introducing a test signal at an input of the network device. The method further includes providing an acoustic signal from the network device to the component in response to the test signal, and receiving at a measurement device an indication of the acoustic quality of the component, where the indication produced by the component is in response to the acoustic signal. Finally, based upon the indication, presenting data representing the acoustic quality of the component.

In yet another embodiment, a measurement system is provided for determining the acoustic quality of a communications component. The system comprises of a model with a substantially ideal communications network and a test-signal generator coupled to the network model for providing a test signal to the network model. The network model produces an acoustic signal in response to the test signal. Also, the system comprises a network component coupled to the network model. The network component produces an indication of acoustic quality in response to the acoustic signal. A data collection device is provided and coupled to the network component to receive the indication of acoustic quality and present data representing the acoustic quality of the network component.

BRIEF DESCRIPTION OF THE SEVERAL VIEWS OF THE DRAWINGS

Embodiments of the present invention are described in detail below with reference to the attached drawing figures, which are incorporated by reference herein and wherein:

FIGS. 2A and 2B illustrate exemplary embodiments of a system for coupling end-point CPEs to a wireless HUB;

FIG. 6 illustrates an embodiment of a method for measuring the acoustic quality of an end-point CPE.

DETAILED DESCRIPTION

Figure 1:
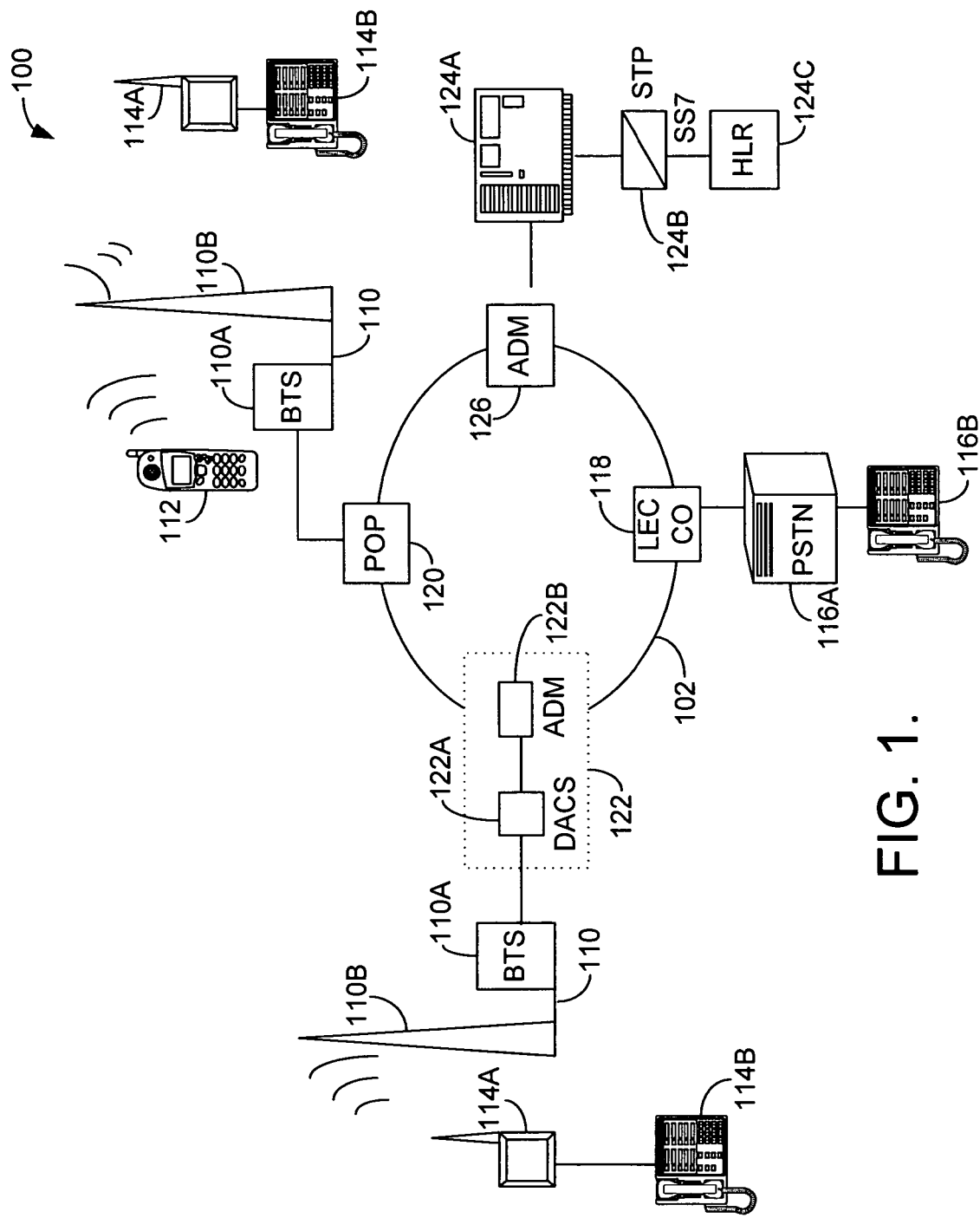
FIG. 1 illustrates an exemplary network architecture 100 incorporating both land-line and wireless networks suitable for practice in accordance with an embodiment of the present invention.

Embodiments of the present invention provide a system and method for analyzing the voice (acoustic) quality of end-point CPEs in a communications network. End-point CPEs include cell phones, analog phones, or wireless HUBs. A wireless HUB provides access to a wireless network by, for example, an analog phone or personal computer. This access to a customer's wireless carrier's network eliminates the need of a land-line connection provided by a traditional carrier.

Throughout this description, various technical terms are used. A definition of such terms can be found in Newton's

*Telecom Dictionary* by H. Newton, 20th Edition (2004). These definitions are intended to provide a clearer understanding of the ideas disclosed herein but are in no way intended to limit the scope of the embodiments of the present invention. The definitions and terms should be interpreted broadly and liberally to the extent allowed by the meaning of the words offered in the above-cited reference. For example, whereas some distinguish the World Wide Web (WWW) as a subcomponent of the Internet, "web"—as used herein—should not be construed as limited to the WWW. Rather, "web" is intended to refer generally to the Internet and/or its related subnetworks and subcomponents.

As one skilled in the art will appreciate, the present invention may be embodied as, among other things: a method, system, or computer-program product. Accordingly, embodiments of the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

FIG. 1 illustrates an exemplary network architecture 100 incorporating both land-line and wireless networks. A call may originate from a cell phone 112 to an analog phone 114B through a HUB 114A. In one embodiment, a call originating from cell phone 112 to an analog phone coupled to a wireless HUB 114B may propagate through a cellular tower 110B, a base station 110A, a first point of presence 120, a land-line network 102, a second point of presence 122, base station 110A, cellular tower 110B, and HUB114A. In another embodiment, a call originating from cell phone 112 to an analog phone 116B may traverse a path through cellular tower 110B and base station 110A, land-line network 102, and then through a local exchange central office 118. In each of the aforementioned exemplary embodiments, the variety of network elements each contribute to the distortion of or decrease in the voice quality of the call. Distortion may be introduced by any element comprising land-line network 102 or any element of a wireless network such as base stations 110A, cellular towers 110B or HUBs 114A. Further increasing distortion is a home lookup registry (HLR) 124C that is generally consulted through a cellular switch 124A in order to establish the identity of a caller using cell phone 112.

Each network element comprising network 100 should be optimized for maximum voice quality at an end-point CPE. Certain acoustic parameters should be measured or analyzed to determine optimum voice quality. These parameters include, but are not limited to, received acoustic quality of an end-point CPE, transmitted acoustic quality of an end-point CPE, sidetone sound levels, and linearity. Sidetones are the feature of a telephone handset that allows a user to hear themselves speak, acting as feedback that the phone is working. Sidetones are short-line echoes bled back into the earpiece, and too much sidetone creates an echo and noise to the far end. Linearity allows the user to hear the pitch and tone of the person to whom they are speaking. However, evaluation of the acoustic qualities of end-point CPEs separately, such as cellular phone 112 and home HUB 114A, is particularly troublesome. Because of this it is difficult to identify whether the CPE or the network is responsible for the degradation of the voice quality. This is due in part to distortion propagated to the end-point CPE by elements comprising network 100.

Referring now to FIGS. 2A and 2B in combination, there are illustrated several exemplary embodiments of a system 200 for coupling end-point CPEs to a wireless HUB 214 (which is also an end-point CPE). In FIG. 2A, a land-line analog phone 210 may be coupled through a port 216 to wireless HUB 214. Wireless HUB 214 communicates to, for example, cellular tower 110B in FIG. 1 through an antenna 218. In FIG. 2B, there is illustrated yet another embodiment of system 200 incorporating HUB 214. In FIG. 2B, system 200 comprises a back-plane 212 which couples land-line analog phones 210 and a personal computer 226 to wireless HUB 214 through ports 220, 222, and 224. Wireless HUB 214 communicates to network 100 through antenna 218. In the embodiment illustrated in FIG. 2B, analog phones 210 and personal computer 226 may be located on separate floors of a home. For example, one analog phone 210 may be coupled directly to HUB 214 on a first floor of the house, while another analog phone 210 located on a second floor of the house may be coupled to HUB 214 through back-plane 212. Personal computer 226 may be located on yet another floor of the house.

Figure 3A:
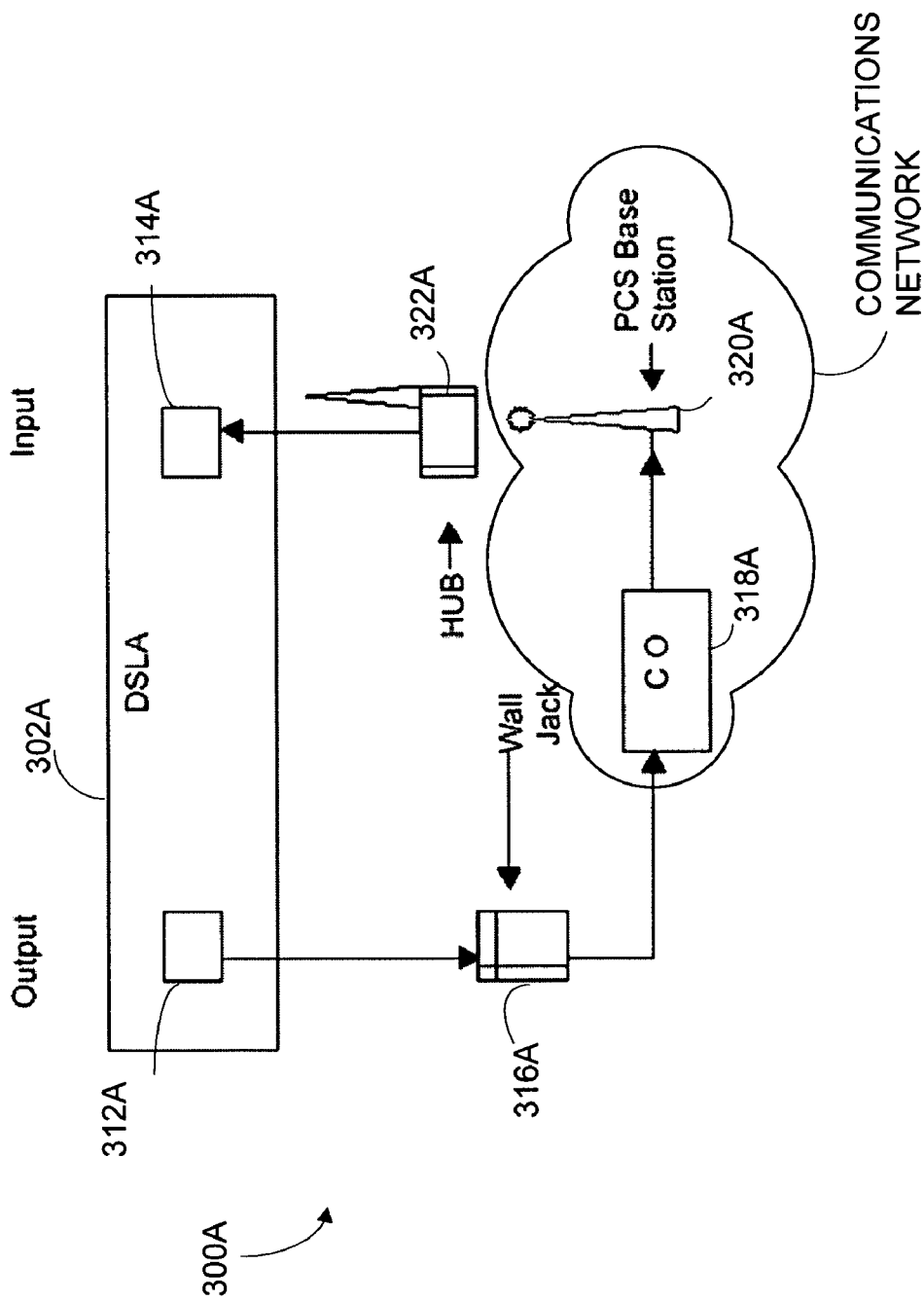
FIG. 3A is a block diagram of a historical system for measuring acoustic quality.
Figure 3B:
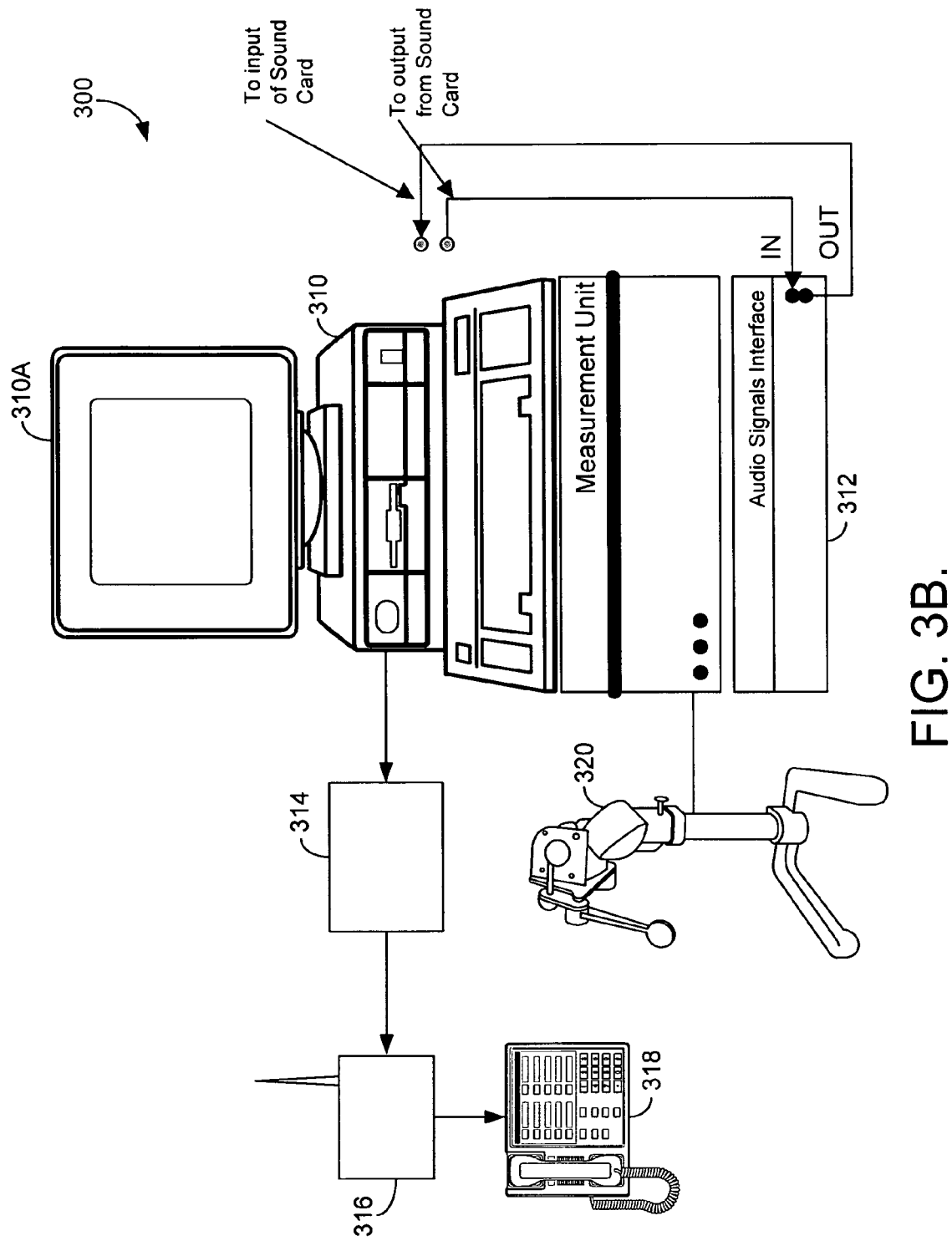
FIG. 3B illustrates an embodiment of the present invention illustrating a system 300 for measuring the acoustic quality of an end-point CPE.

Referring now to FIG. 3B, there is illustrated an embodiment of the present invention illustrating a system 300 for measuring the acoustic quality of an end-point CPE 316 (wireless HUB). System 300 comprises a measurement device 310, a model of a substantially ideal communications network 314, end-point CPE 316, a land-line analog phone 318, an acoustic measurement stand 320, and a test signal generator 312. Although system 300 comprises a wireless HUB as CPE 316, other embodiments may comprise any number of CPEs, such as a cellular telephone. Further, land-line phone 318 may be any device known in the art that is capable of transmitting an acoustic response to measurement stand 320, such as a cellular telephone. Acoustic measurement stand 320 may be any type of suitable acoustic microphone stand known in the art. Moreover, measurement device 310 may be, but is not limited to, a personal computer, laptop, workstation, or other suitable measurement device. Measurement device 310, may, for example, be a Microtronix™ IP-II. Moreover, a test signal generator may be any device capable of generating electronic signals for purposes of testing acoustic quality of components in a communications network. Also, network model 314 may be any software or hardware device capable of emulating an acoustic signal (such as a CDMA signal) for purposes of testing an end-point CPE. The network model may, for example, be a CMU-200 CDMA wireless network simulator manufactured by Tetronix™ that simulates a distortionless communications network. Other devices can be used to model a communications network that offer functionality similar to that of the CMU-200, which itself is one of various flavors of devices.

In operation, test signal generator 312 transmits an analog RF signal to network model 314. Network model 314 converts the received analog signal from test signal generator 312 into a digital acoustic signal and transmits the acoustic signal to HUB 316 via a wire line coupled to a port of HUB 316. HUB 316 transmits the acoustic signal to analog phone 318. Assuming analog phone 318 has been previously tested and has an acceptable acoustic quality, the acoustic signal may be measured by acoustic measurement stand 320. Measurement stand 320 transmits an indication of acoustic quality to measurement device 310. Measurement device 310, using the data acquired by the indication of acoustic quality, measures any number of acoustic parameters. The acoustic parameters include, but are not limited to, a receive frequency response, to analyze the voice quality received by the wireless HUB 316; a transmit frequency response, to analyze the voice quality transmitted by the wireless HUB 316; and a sidetone frequency response, to check the sidetone levels of the wireless HUB 316. Measurement device 310 may present this data to a user in graphical form on a presentation device 310A. Although system 300 illustrates test signal generator 312 and measurement device 310 as separate devices, generator 312 and device 310 may be incorporated into one device. Exemplary results using system 300 are illustrated in FIGS. 4A through 4C.

Figure 4A:
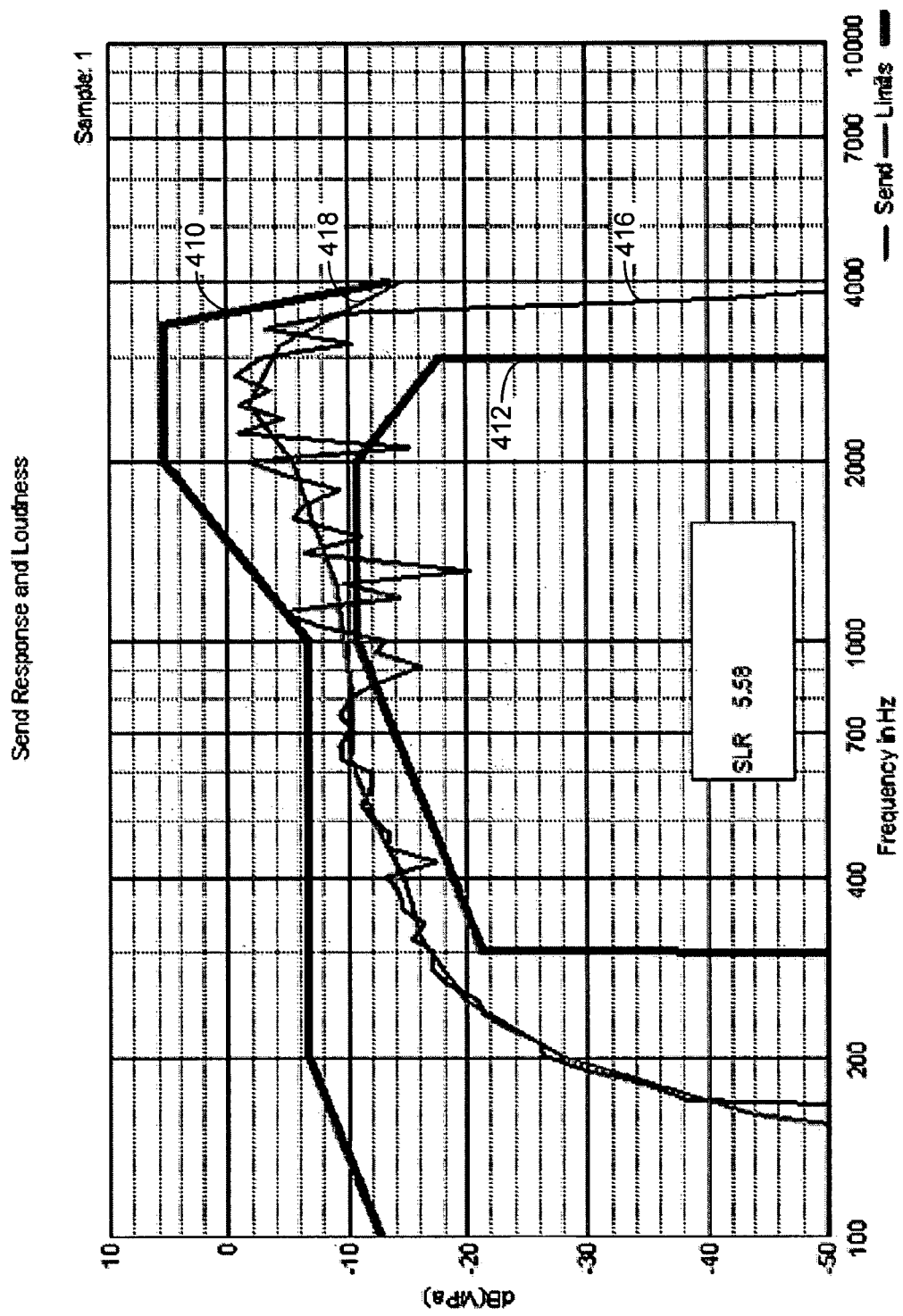
FIGS. 4A-5B illustrate, in graphical form, transmit, receive, and sidetone frequency responses for an the exemplary system of FIG. 3B.
Figure 4B:
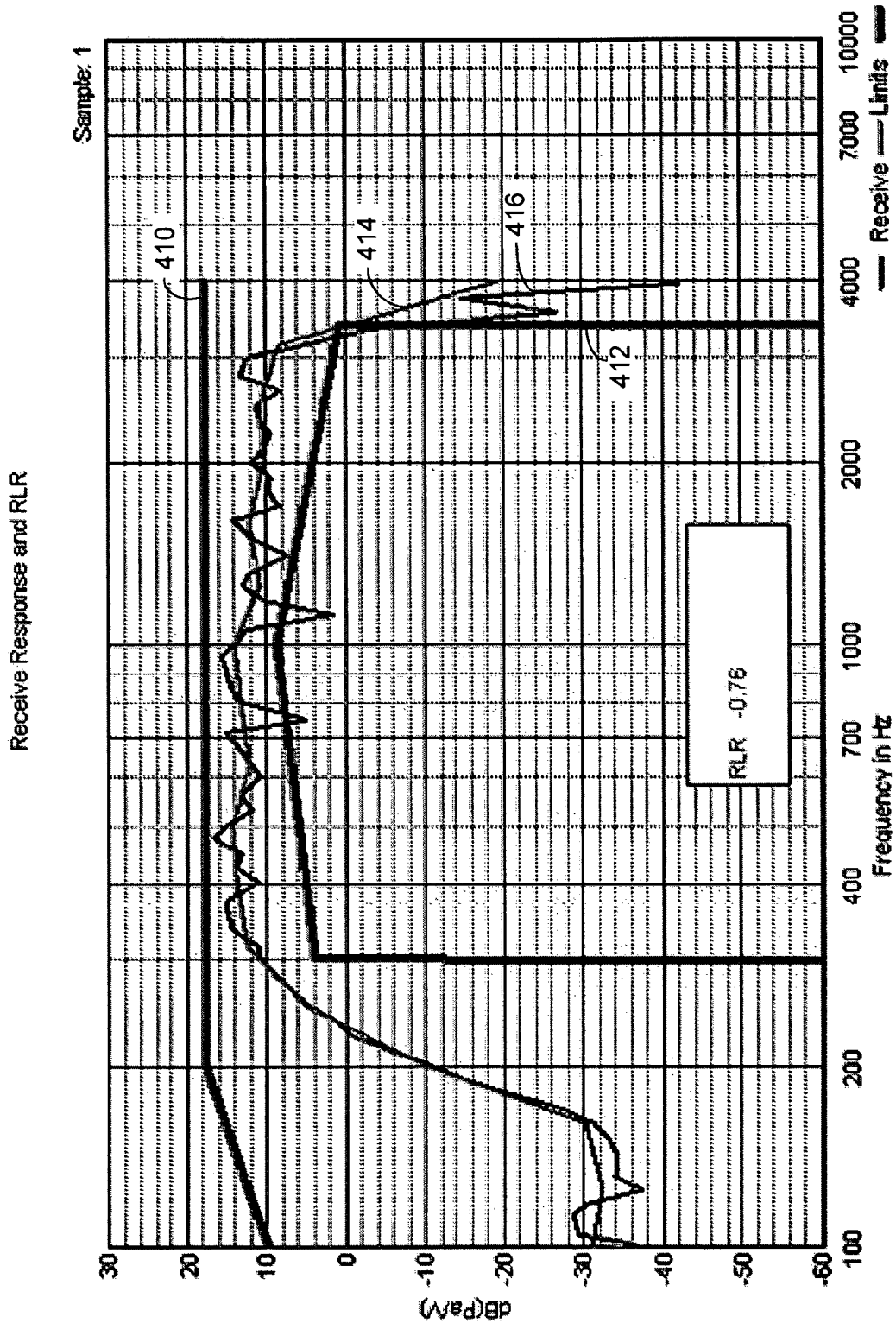
Figure 4C:
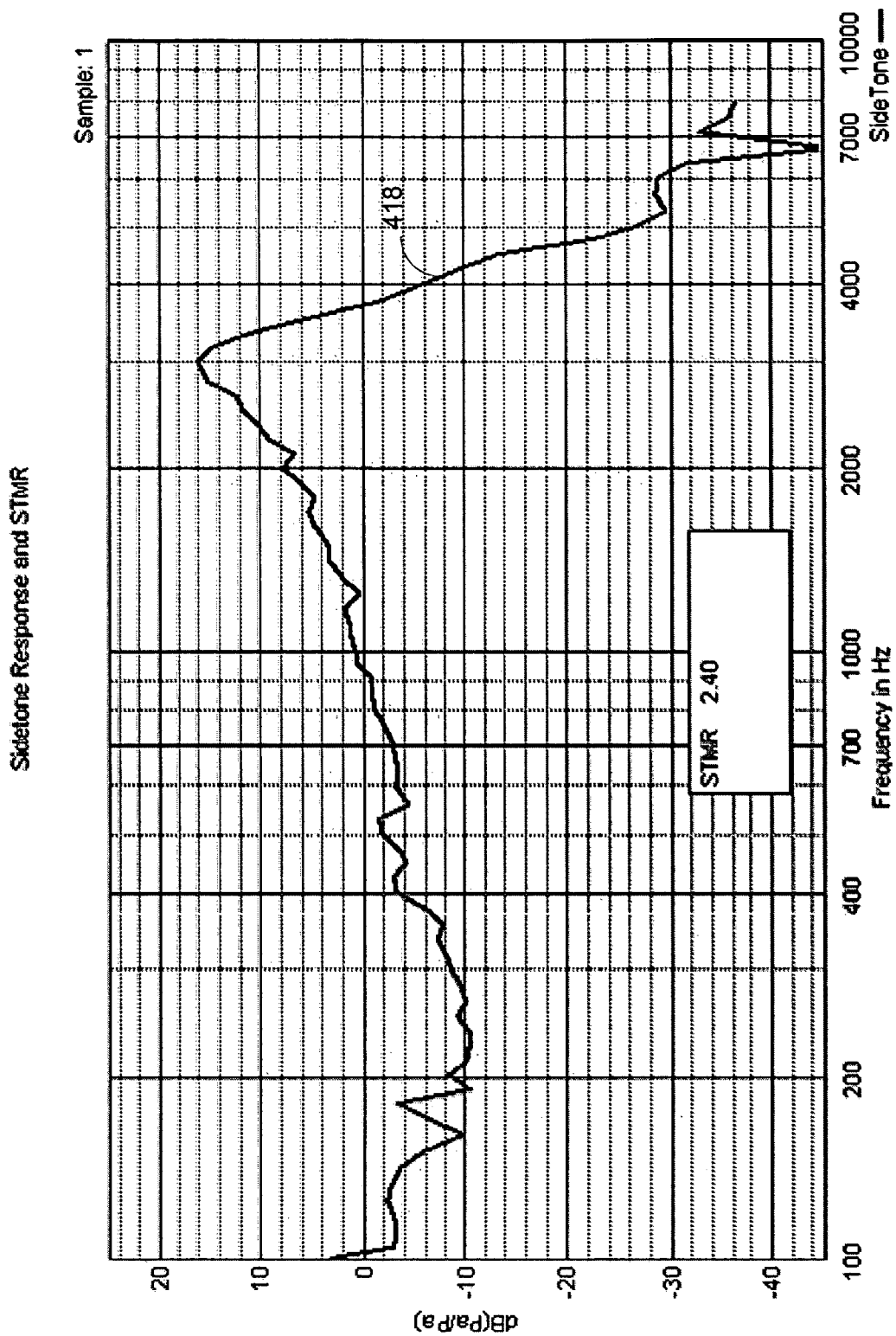
Figure 5A:
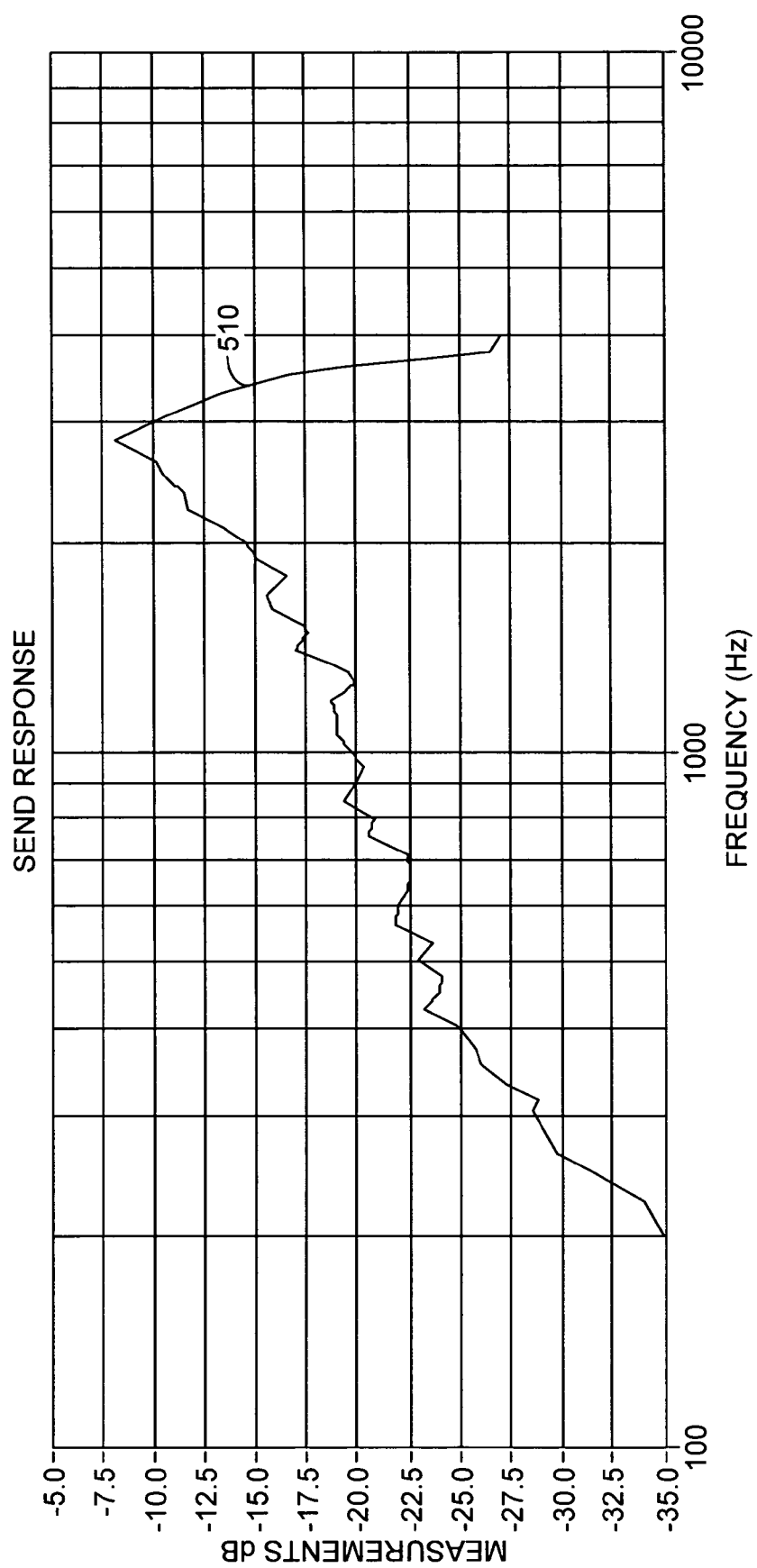
Figure 5B:
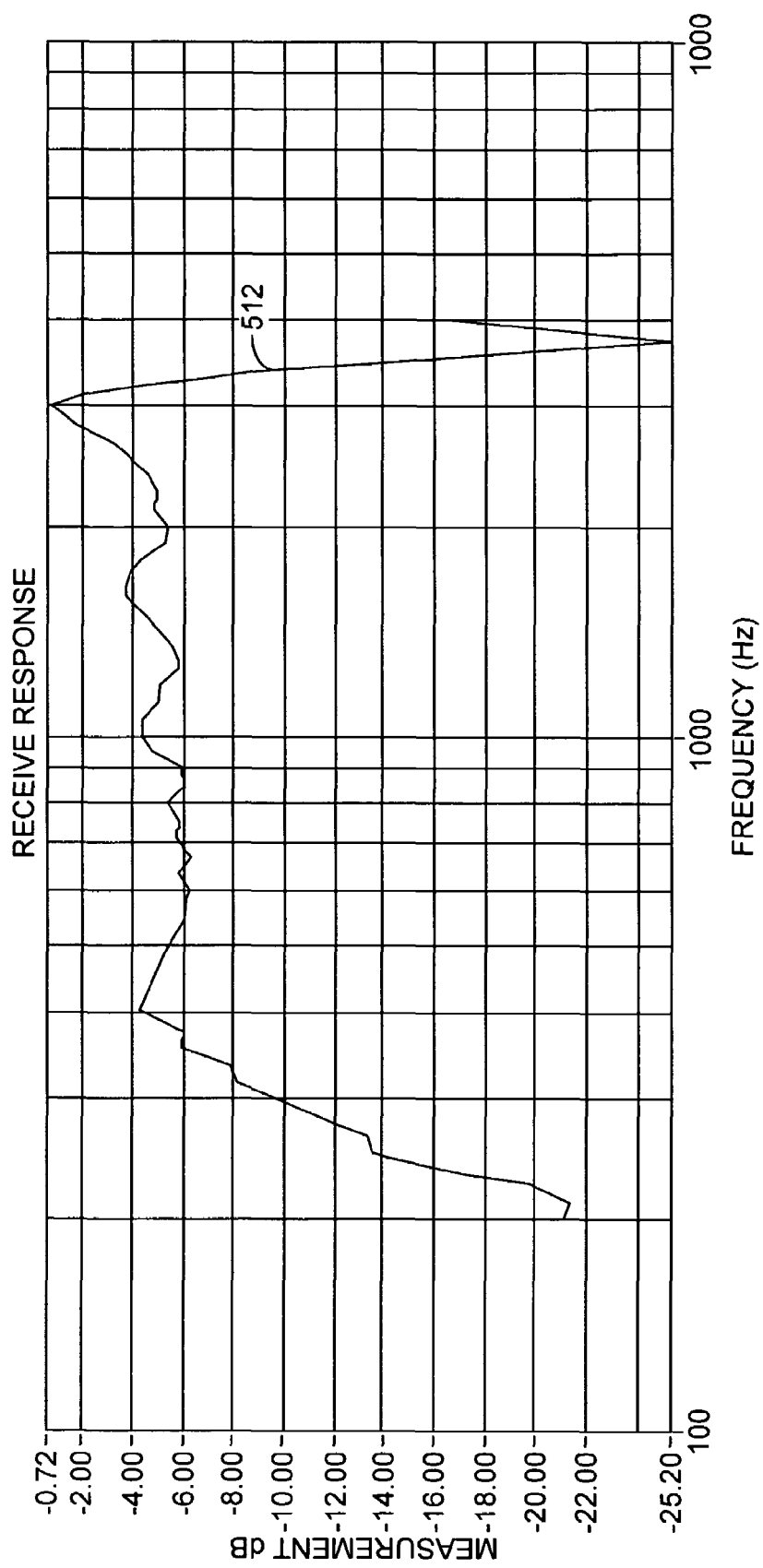

Referring in combination to FIGS. 4A-4C, there are illustrated in graphical form transmit, receive, and sidetone frequency responses for an exemplary system, such as system 300 illustrated in FIG. 3B. The end-point CPE being evaluated was a CDMA HUB, manufactured by Tellular™. Testing of the CDMA HUB was performed using a sine wave test signal. Testing could also be accomplished using a TSG-C SWG 4.1 EAAH test signal (FIGS. 5A-5B). The latter produces more repeatable results for CDMA end-point CPEs because the codecs used are better adapted for CDMA devices.

Referring now to FIGS. 4A and 4B, there are illustrated lines 410 and 412, which set boundaries for transmit and receive frequency responses of a wireless communication device. Boundaries 410 and 412 are determined by the Telecommunications Industry Association (TIA) requirements. Raw data received by acoustic measurement device 320 and indicated to measurement device 310 is illustrated by a line 416. Using a band average technique, common in the industry, data received by measurement device 310 is averaged together into line 414. FIGS. 5A and 5B illustrate exemplary transmit and receive frequency responses using the aforementioned TSG-C SWG 4.1 EAAH test signal. The band average technique is not used because the variance of raw data illustrated by lines 510 and 512 in FIGS. 5A and 5B are not as great as in FIGS. 4A and 4B. As is illustrated in FIGS. 4A and 4B, the transmit and receive frequency response of the CDMA HUB is well within industry standard limits as determined by the TIA. Further, the TIA standard for send loudness response (SLR) is 8+/−3 dB and the requirement for the receive loudness response (RLR) is 2+/−3 dB. As can be seen in FIGS. 4A and 4B, the SLR and RLR parameters are within industry standards. Referring to FIG. 4C, there is shown a sidetone frequency response 418. As determined by industry standards, a sidetone masking rating (STMR) of 2.40 is well within industry standards.

Referring now to FIG. 6, there is illustrated an embodiment of a method 600 for measuring the acoustic quality of HUB 316 of system 300. Method 600 begins at a step 610 with the transmission of a test signal (either sinusoidal or EAAH) by test signal generator 312 to network model 314. At a step 612, network model 314 outputs a substantially distortionless acoustic signal (such as a CDMA signal) to end-point CPE 316. At a step 614, the acoustic signal is received by CPE 316. At a step 616, the acoustic signal is transmitted to analog phone 318, which outputs an indication of acoustic quality to measurement stand 320. Measurement device 310 receives the indication of acoustic quality from measurement stand 320 and analyzes the indication to measure any number of acoustic parameters. Finally, at a step 618, data representing acoustic quality is presented on presentation device 310A.

Embodiments of the present invention are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

I claim:

1. A method for testing a network communications component, comprising:
   providing a model of a substantially ideal communications network;
   generating a test signal at an input of the network model, the network model providing an output signal to the network component suitable for analyzing one or more acoustic parameters of the network component, wherein the output signal is a signal that would result from the test signal traversing a substantially ideal communications network;
   communicating the output signal from the component to a device capable of transmitting an indication of acoustic quality to an acoustic microphone;
   receiving at the acoustic microphone the indication of acoustic quality;
   transmitting the indication of acoustic quality to an acoustic measurement device;
   deriving from the indication one or more acoustic parameters; and
   analyzing the one or more acoustic parameters based upon a response of the network component to the output signal.

2. The method of claim 1, wherein the network component comprises wireless end-point customer premises equipment (CPE).

3. The method of claim 2, wherein the end-point CPE comprises a wireless HUB.

4. The method of claim 2, wherein the end-point CPE comprises a wireless phone.

5. The method of claim 1, wherein the test signal is a sine wave signal.

6. The method of claim 1, wherein the test signal is compatible with a TSG-C SWG 4.1 EAAH test signal for testing CDMA network components.

7. The method of claim 1, wherein the output signal is an acoustic signal.

8. The method of claim 1, wherein the acoustic parameters comprise a transmit frequency response, a receive frequency response, a sidetone frequency response, and a linearity response.

9. A method for evaluating acoustic qualities of a component in a wireless network, comprising:
providing a network device that represents at least a portion of a substantially distortionless wireless network;
coupling the network device to the component;
introducing a test signal at an input of the network device, the network device providing an acoustic signal to the component in response to the test signal, wherein the acoustic signal is a signal that would result from the test signal traversing a substantially distortionless wireless network;
communicating the acoustic signal from the component to a device capable of transmitting an indication of acoustic quality to an acoustic microphone;
receiving at a measurement device via the acoustic microphone the indication of the acoustic quality of the component, the indication produced by the component in response to the acoustic signal; and
based upon the indication, the measurement device presenting data representing the acoustic quality of the component.

10. The method of claim 9, wherein the network component comprises endpoint customer premises equipment (CPE).

11. The method of claim 10, wherein the end-point CPE comprises a wireless HUB.

12. The method of claim 10, wherein the end-point CPE comprises a wireless phone.

13. The method of claim 9, wherein the test signal is a sine wave signal.

14. The method of claim 9, wherein the test signal is compatible with a TSG-C SWG 4.1 EAAH test signal suitable for testing CDMA network components.

15. The method of claim 9, wherein the measurement device further comprises an acoustic microphone coupled to the component.

16. The method of claim 9, wherein the data representing the acoustic quality of the component comprises a transmit frequency response, a receive frequency response, and a sidetone frequency response.

17. A measurement system comprising:
a network model representing a substantially ideal communications network;
a test-signal generator coupled to the network model and operable to provide a test signal to the network model, the network model providing an acoustic signal in response to the test signal, wherein the acoustic signal is a signal that would result from the test signal traversing a substantially ideal communications network;
a network component coupled to the network model, the network component producing an indication of acoustic quality in response to the acoustic signal; and
a data collection device coupled to the network component by way of a device capable of communicating the indication of acoustic quality, the data collection device operable to receive via an acoustic microphone the indication of acoustic quality and present data representing the acoustic quality of the network component.

18. The system of claim 17, wherein the network component comprises an end-point customer premises equipment (CPE).

19. The system of claim 17, wherein the data collection device comprises a measurement device and an acoustic microphone.

20. The system of claim 19, wherein the measurement device comprises a computer coupled to a display.

21. The system of claim 17, wherein the network model comprises hardware representing a substantially distortionless communications network.

22. The system of claim 17, wherein the network model comprises a computer having software that models an ideal communications network.

* * * * *